United States Patent [19]

Tatsumi

[11] 4,053,289
[45] Oct. 11, 1977

[54] GRINDING METHOD AND APPARATUS WITH METAL REMOVAL RATE CONTROL

[75] Inventor: Youji Tatsumi, Funabashi, Japan

[73] Assignee: Kabushiki Kaisha Daini Seikosha, Japan

[21] Appl. No.: 609,948

[22] Filed: Sept. 3, 1975

[30] Foreign Application Priority Data

Sept. 3, 1974 Japan ............................ 49-101241

[51] Int. Cl.² .............................................. B24B 49/04
[52] U.S. Cl. ................................. 51/281 R; 51/165.77; 51/165.88; 51/165.92
[58] Field of Search .......... 51/165 R, 165.77, 165.91, 51/165.92, 281 R, 165.88

[56] References Cited
U.S. PATENT DOCUMENTS

| | | | |
|---|---|---|---|
| 3,589,077 | 6/1971 | Lenning | 51/165.92 |
| 3,785,091 | 1/1974 | Pozzetti | 51/165.91 |
| 3,842,545 | 10/1974 | Possati | 51/165.91 |
| 3,846,689 | 11/1974 | Possati | 51/165.91 |
| 3,859,755 | 1/1975 | Schaller | 51/165.92 |
| 3,964,210 | 6/1976 | Moritomo | 51/165.77 |

Primary Examiner—Harold D. Whitehead
Attorney, Agent, or Firm—Robert E. Burns; Emmanuel J. Lobato; Bruce L. Adams

[57] ABSTRACT

Grinding method and apparatus in which metal removal rate of workpieces is controlled to predetermined values at least during fine grinding. The metal removal is measured out by an in-process size detector, which measures the workpiece diameter under grinding, and is compared with one of the predetermined values directly or indirectly after being converted into metal removal-to-time rate. The deviation of metal removal from the predetermined value effects to control the infeed movement of an infeed table which displaces the grinding wheel to infeed relative to the workpiece.

6 Claims, 6 Drawing Figures

GRINDING METHOD AND APPARATUS WITH METAL REMOVAL RATE CONTROL

BACKGROUND OF THE INVENTION

This invention relates to a grinding method and apparatus to control grinding conditions such as infeed speed on a grinding machine according to transition of grinding phenomina in the grinding processes.

The prior art includes the art that, after infeeding the infeed table with a constant infeed speed, a desired spark-out time is maintained to grind up a workpiece to have a desired diameter in an internal grinder of constant infeed method.

But, in this constant infeed art, the metal removal rate, that is, grinding ability becomes lowered in porportion to sharpness deterioration of the grinding wheel. Accordingly, the constant infeed becomes heavier infeed over reasonable value and the surface roughness and the cylindricity of the workpiece become deteriorated.

Therefore, in the conventional art, dressing of the grinding wheel is required after a predetermined number of workpiece grindings which are counted by a skip-counter. This number is changed according to differences of grinding wheels, workpiece material, grinding condition or grinding grade to be achieved. Deviation of workpiece diameters after the advanced procedure or that of grinding wheels often deteriorates the wheel sharpness earlier than when the predetermined grinding number is passed. This lowers grinding quality.

On the contrary, when good wheel sharpness and grinding ability is still maintained after the predetermined number of workpiece grindings, the grinding wheel is over-dressed and shortlived. This further lowers the operational rate of the grinding machine.

This invention is intended to overcome the above mentioned faults.

BRIEF SUMMARY OF THE INVENTION

It is an object of the present invention to provide a grinding method with metal removal rate control in which superior cylindricity and roundness of a ground workpiece are attained.

It is another object of this invention to provide a grinding method or apparatus with metal removal rate control in which suitable infeed for the grinding wheel or the wheel arbor is maintained so that the grinding wheel maintains a grinding ability long after a dressing and excessive dressing frequency is avoided.

It is another object of the invention to provide a grinding method or apparatus having a combination of metal removal rate control and residual metal removal control in which both of good grinding efficiency with short grinding cycle time and precise grinding finishing on workpieces are attained.

It is still a further object of the invention to provide a grinding method or apparatus having a combination of metal removal rate control and ratio control of infeed speed to workpiece revolutional speed in which superior surface roughness is attained on workpieces as well as good cylindricity and roundness.

These and other objects have been attained by the grinding method or apparatus in which metal removal of a workpiece is measured continuously or intermittently during some grinding operation and compared with predetermined metal removal program values, and the difference of the actual metal removal from the program value is used to control a driving device of the infeed table to suppress the difference. Grinding tool deterioration is measured during grinding, and the predetermined metal removal program value is decreased when the measured deterioration exceeds a certain amount.

DETAILED DESCRIPTION OF THE PREFERRED EMBODIMENTS

Figure 1:
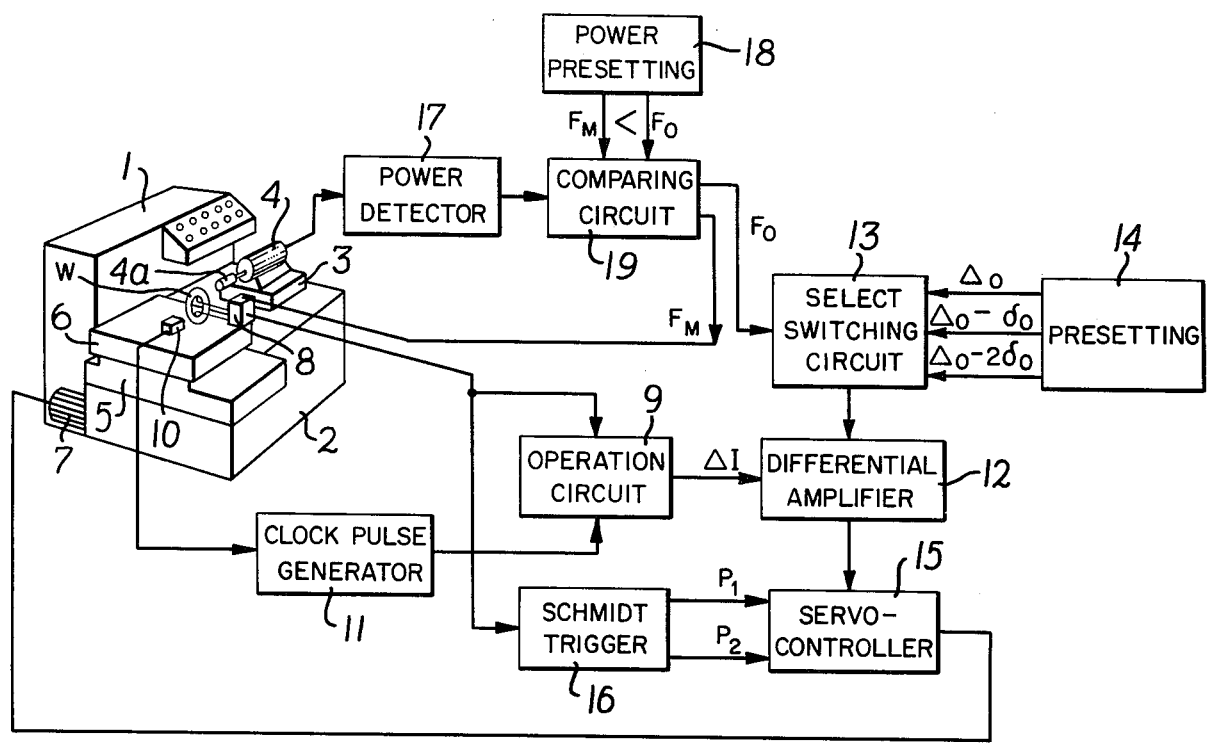
FIG. 1 is a block diagram with a partial perspective view of a preferred embodiment according to this invention.

Referring first to FIG. 1 which shows a centerless internal grinder which applies the metal removal rate control method of this invention, reference numeral 1 shows the centerless internal grinder schematically illustrated, which has a bed 2, a wheel table 3 on bed 2 slidable in the axial direction of a grinding wheel spindle 4 mounted thereon, and a work table 5 mounted on bed 2 at the front of wheel table 3. An infeed table 6 which has a work spindle head (not shown) thereon is mounted on wheel table 3 slidable in a perpendicular horizontal direction relative to the wheel spindle axis. A servo-motor 7 is mounted on bed 2 for effecting infeed movement to infeed table 6. Said work spindle head holds a workpiece W rotatable with its spindle.

Reference numeral 8 designates an in-process size detecting means which continuously, measures the inner diameter of workpiece W under grinding process. The output of in-process size detector 8 is transmitted to an operation circuit 9. A revolution counter 10 of workpiece W develops an output according to the workpiece revolution and sends it to a sampling clock pulse generator 11. Clock pulses generated by sampling clock pulse generator 11 are also transmitted to operation circuit 9. The clock pulses acts as gate pulses for the signals from size detector 8 in operation circuit 9 in a manner that one signal from size detector 8 at a first clock pulse is subtracted from another signal at a second clock pulse. Thus, the metal removal rate $\Delta I$ of the inner diameter for a workpiece revolution is computed out from the output of size etector 8 and that of clock pulse generator 11 and is transmitted to a differential amplifier 12. Differential amplifier 12 also receives a metal removal rate value which is set at a presetting means 14 and is fed through a select switching circuit 13. The output of differential amplifier in proportion to the difference of the two inputs is supplied to a servo-controller 15 which controls infeed motor 7 to maintain a suitable infeed speed on infeed table 6 so that the output of differential amplifier 12 converges to zero.

Servo-amplifier 15 receives further outputs of Schmidt trigger circuits 16 which receives in turn the output of in-process size detecting means 8. An output $P_1$ is generated from one of Schmidt trigger circuits 16 when it receives a size signal corresponding to a first predetermined inner diameter on the workpiece, and the other output $P_2$ is generated when another Schmidt trigger circuit receives a size signal corresponding to a second predetermined inner diameter, output $P_1$ changing servo-amplifier 15 to cut off the input terminal which receives the differential amplifier output thereby effecting finish infeeding to infeed table 6 and output $P_2$ changing servo-amplifier 15 to operate rapid reverse thereby effecting quick return on infeed table 6, which is illustrated in FIG. 2.

Reference numeral 17 designates an electric power consumption detector which measures power consumption on the spindle motor of wheel spindle 4. This power consumption is in proportion to the tangential grinding force. The output of power consumption detector 17 is transmitted to a comparing circuit 19 which receives further power consumption values preset at a power presetting means 18. An output $F_o$ of comparing circuit 19 is transmitted to select switching circuit 13 as a switching signal, another output $F_m$ being transmitted to in-process size detecting means as starting signal.

In operation of the above described embodiment, wheel spindle 4 is fed toward workpieces W at first, inserting the grinding wheel 4a into the hole of workpiece W. After that, servo-driver 15 drives servo-motor 7 to feed infeed table 6.

Figure 2:
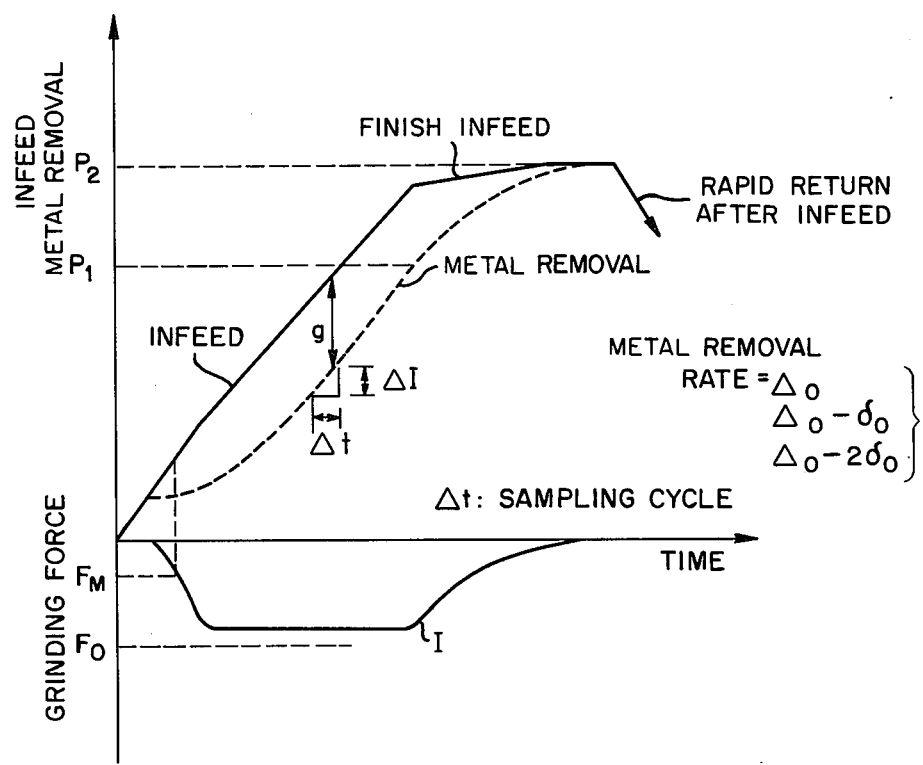
FIG. 2 is a graph representing timing curves of infeed, actual metal removal and grinding force in the embodiment in FIG. 1.

FIG. 2 is a graph representing infeed state, in which infeeding speed of infeed table 6 is kept constant at the first step. When the inner wall of workpiece W comes in contact with grinding wheel 4a and the wheel arbor which supports grinding wheel 4a at the top is bent somewhat so that the wheel 4a starts to grind workpiece W, grinding force caused therefrom increases gradually as shown by a curve I in FIG. 2. The gradual increasing of the grinding force raises power consumption of the wheel spindle motor and, when the actual power consumption reaches a value $F_m$ which is preset at power presetting means 18, output signal $F_m$ is sent to in-process size detector 8 for starting size measuring. Detected signal by size detector 8 is continuously transmitted to operation circuit 9 and converted into metal removal rate $\Delta I$ with the aid of clock pulses from clock pulse generator 11.

Differential amplifier 12 receives rate $\Delta I$ and a first preset rate value $\Delta_o$ which is transmitted from presetting means 14 through select switching circuit 13. Actual rate $\Delta I$ is compared with preset rate $\Delta_o$ and servo-motor 7 is so controlled to converge the difference between rates $\Delta I$ and $\Delta_o$. Thus, wheel 4a grinds workpiece W with a constant metal removal rate $\Delta_o$, having a residual metal removal g.

In this constant grinding condition, the inner diameter of workpiece grows to a value corresponding to preset value $P_1$ which is predetermined as a Schmidt trigger level in Schmidt trigger circuits 16. At this point, servo-controller 15 is cut off from signals of differential amplifier 12 and is changed to operate finish feed drive on servo-motor 7, infeeding infeed table 6 with a very slow speed for finish grinding. A little before $P_2$, servo-controller 15 receives stop signal for effecting spark-out process from an infeed table position detector which is not shown in FIG. 1. When in-process size detector 8 detects size $P_2$ (complete size of inner diameter), servo-motor 7 is reversed to return infeed table 6, finishing one grinding cycle.

Grinding ability of wheel 4a is deteriorated gradually with successive grinding cycles each of which includes an infeed process keeping $\Delta I$ equal to $\Delta_o$. This raises grinding force and the wheel spindle power consumption reaches a value $F_o$. A switching signal $F_o$ is sent to switching circuit 13 from comparing circuit 19, changing $\Delta_o$ to $\Delta_o - \delta_o$ (a little smaller than $\Delta_o$) to transmit to differential amplifier 12. The differential amplifier 12 compares actual metal removal rate $\Delta I$ with a second preset metal removal rate $\Delta_o - \delta_o$, controlling servo-controller 15 to decrease servo-motor speed. As a result, the infeed speed of infeed table 6 decreases, accompanying with decrease of metal removal rate $\Delta I$ to $\Delta_o - \delta$.

This means that the grinding operation is performed with infeed speed control of infeed table 6 in which metal removal rate $\Delta I$ is kept at the lower value $\Delta_o - \delta_o$ according to deterioration of grinding wheel sharpness or ability. Thus, grinding force is kept smaller than $F_o$ and the metal removal curve in FIG. 2 shifts lower.

If the grinding wheel sharpness further deteriorates so that the grinding force reaches again the value $F_o$ in metal removal control is carried out at a rate "$\Delta I = \Delta_o - \delta_o$," before in-process size detector 8 develops an output of $P_1$, comparing circuit 19 generates and sends an output of $F_o$ again to select switching circuit 13, changing it to the next step in which a first preset value $\Delta_o - 2\delta_o$ of presetting means 14 is transmitted to differential amplifier 12 through select switching circuit 13. Therefore, actual metal removal rate $\Delta I$ is, in this case, controlled to be equal to $\Delta_o - 2\delta_o$. After this metal removal rate control, output $P_1$ is given by size detector 8, and then the following grinding process the same as mentioned above is performed.

Further reaching of grinding force at $F_o$ during metal removal carried out of a rate "$\Delta I = \Delta_o - 2\delta_o$" before in process size detector 8 develops an output of $P_1$ is followed by a dressing while the grinding cycle is stopped.

In the embodiment described above, constant metal removal is maintained so that excellent grinding ability is achieved without over loading or workpiece surface rubbing, attaining excellent cylindricity and surface roughness on workpieces. Dressing is required only when the grinding ability of the grinding wheel is lowered and the grinding force grows up over a predetermined limit, which imparts longer life to the grinding wheel and higher efficiency to grinding operation cycles.

Figure 3:
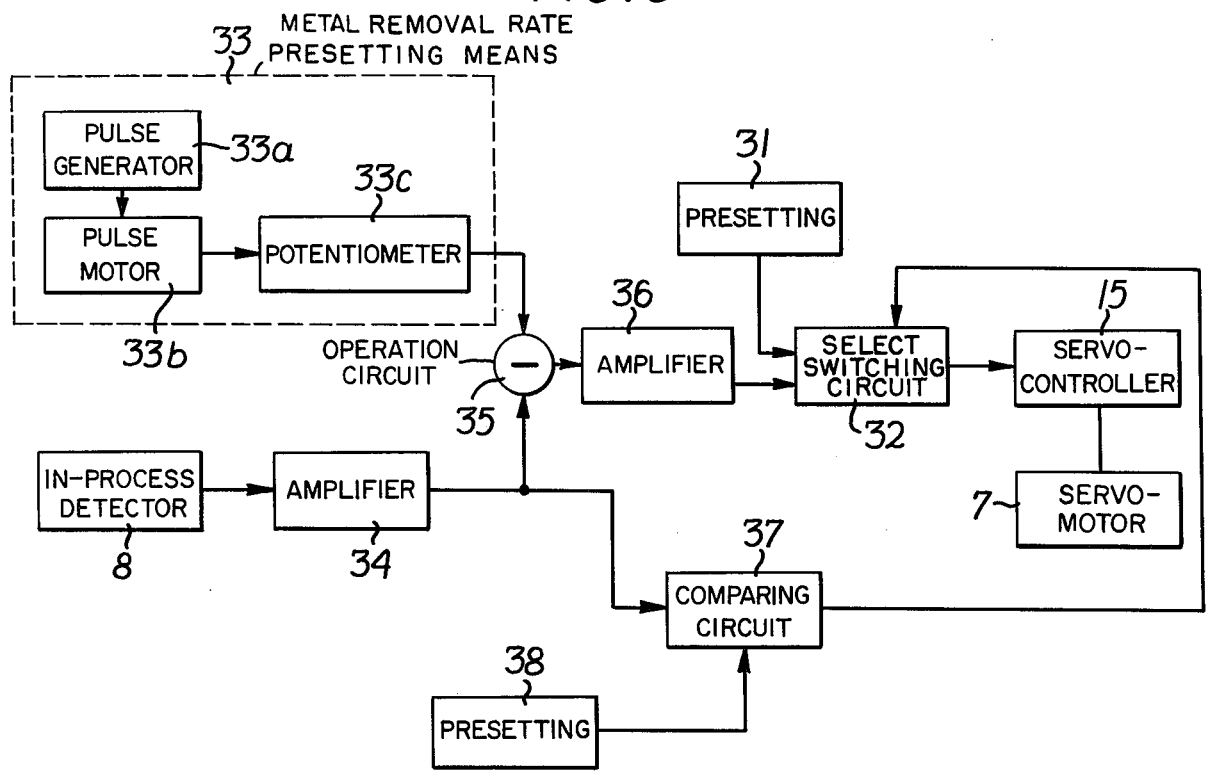
FIG. 3 is a block diagram of another embodiment according to the invention.
Figure 4:
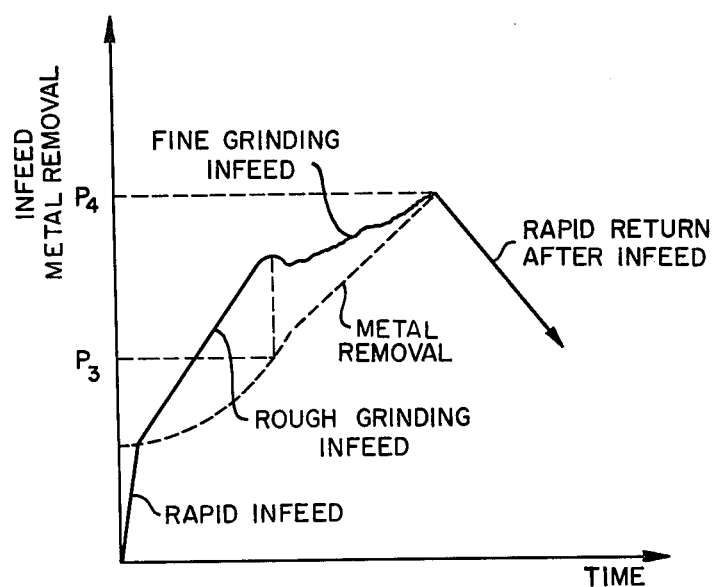
FIG. 4 is a graph representing timing curves of infeed and actual metal removal in the embodiment in FIG. 3.

Referring now to a second embodiment according to the invention, shown in FIGS. 3 and 4 in which metal removal rate control is carried out to effectuate a grinding step while a constant infeed speed is adapted for a rough grinding step before the fine grinding, rough grinding infeed speed presetting means 31 has a preset value, using which ground surface roughness of workpieces is rather rough but high grinding efficiency and good cylindricity are attained. The preset value of presetting means 31 is transmitted to a select switching circuit 32 for controlling servo-motor 7 through servo-controller 15.

Referrence numeral 33 designates a metal removal rate presetting means for a fine grinding step, which consists of a pulse generator 33a, a pulse motor 33b driven by pulse generator 33a, and a potentiometer 33c which is rotated by pulse motor 33b. Potentiometer 33c generates an output increasing along a linear line in response to pulse motor rotation for metal removal rate control in fine grinding.

Workpiece diameter signal detectected by in-process size detector 8 is transmitted through an amplifier 34 to an operation circuit 35 together with the output from potentiometer 33c. Operation circuit 35 generates an output proportional to the difference of its two inputs, the signal from potentiometer 33c and that from amplifier 34. This output of operation circuit 35 is transmitted to select switching circuit 32 through an amplifier 36.

Output of size detector 8 is transmitted to a comparing circuit 37 through amplifier 34. Comparing circuit 37 also receives preset signals $P_3$ and $P_4$ provided in step presetting means 38. $P_3$ corresponds to the changing point from a rough grinding step to a fine grinding step, $P_4$ corresponds the finish size of workpieces. When an input signal from size detector 8 coincides with $P_3$ or $P_4$ from step presetting means 38 in comparing circuit 37, comparing circuit 37 generates an output to shift select switching circuit 32 successively.

In operation of this embodiment, the infeed table is first fed rapidly by servo-motor 7 till the grinding wheel reaches close to the workpiece. At this point, select switching circuit 32 is shifted to transmit the present value of presetting means 31 to servo-controller 15, thereby servo-motor 7 drives the infeed table a rough grinding speed, as is shown in FIG. 4.

When the grinding process reaches at $P_3$ in FIG. 4 after performing rough grinding before fine grinding, the output of in-process size detector 8 coincides with $P_3$ of presetting means 38, thereby comparing circuit 37 generates a coincident signal. This coincident signal enables select switching circuit 32 to shift to cut off the signal of rough grinding infeed presetting means 31 and to an transmit output from operation circuit 35 into servo-controller 15.

At point $P_3$ in FIG. 3, pulse generator 33a starts to send its pulses to pulse motor 33b and the output of potentiometer 33c grows lineally. The difference value of the output of size detector 8 from the growing output of potentiometer 33c is computed by operation circuit 35 and is transmitted to servo-controller 15 through select switching circuit 32, thereby servo-motor 7 is driven with metal removal rate corresponding to the potentiometer output, effecting fine grinding process.

When the diameter of workpiece reaches a finish value, output of size detector 8 coincides with $P_4$ of presetting means 38 at comparing circuit 37, so that coincident signal is generated there and it shifts select switching circuit 32 to cut off the output of operation circuit 35. Servo-controller 15, as a result, effects rapid return movement to servo-motor 7.

Figure 5:
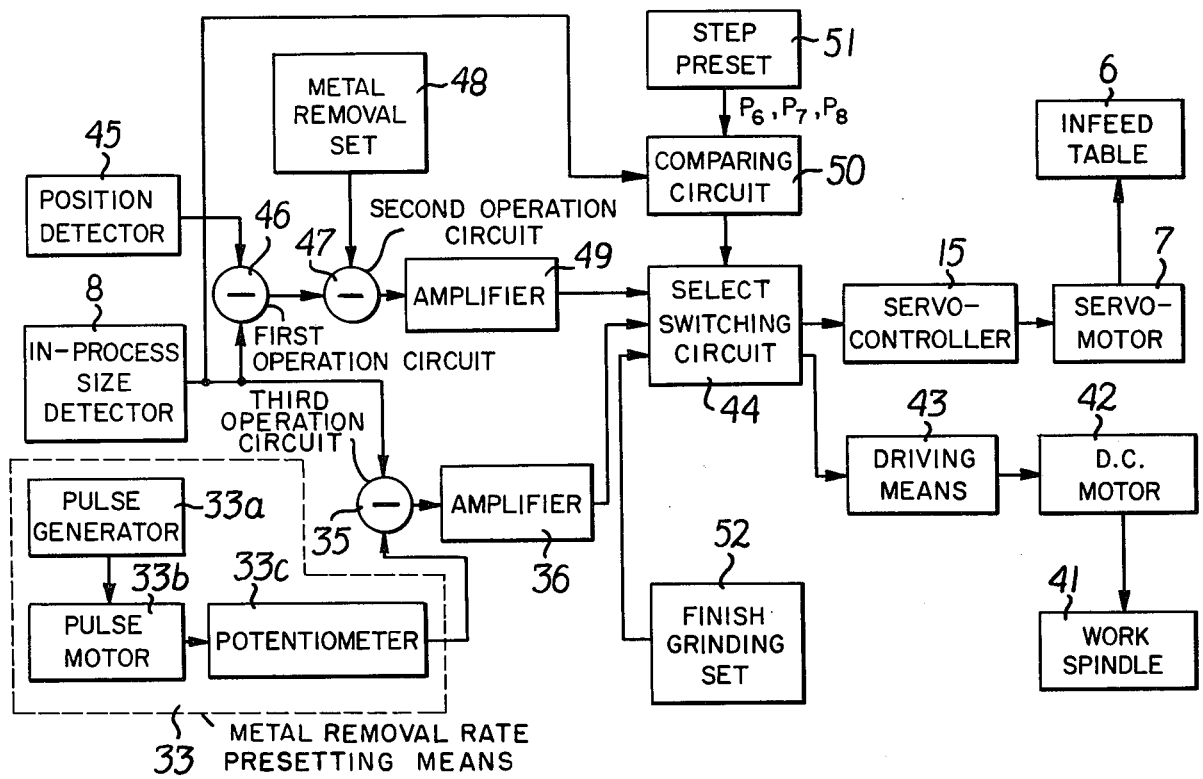
FIG. 5 is a block-diagram of a third preferred embodiment according to the invention.
Figure 6:
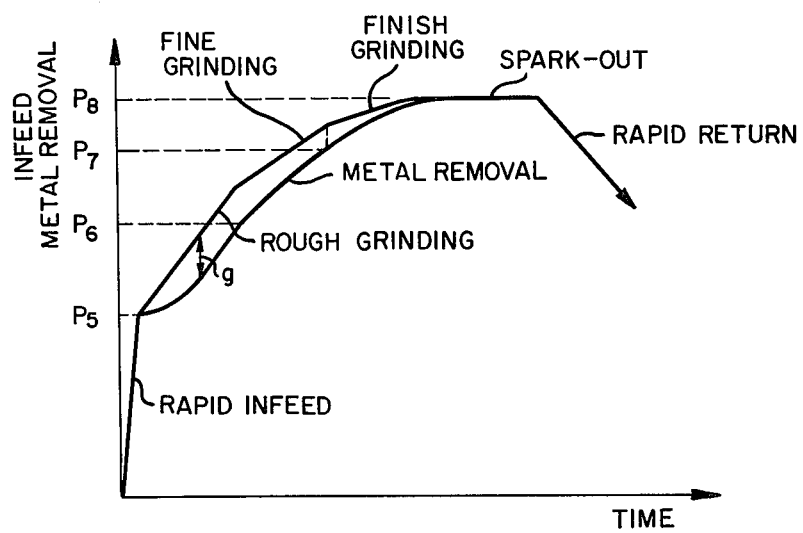
FIG. 6 is a graph representing timing curves of infeed and actual metal removal in the embodiment in FIG. 5.

Next, referring to a third embodiment of the invention shown in FIGS. 5 and 6, which includes residual stock-removal control for rough grinding and infeed speed/work revolutional speed control for finish grinding after fine grinding of metal removal rate control, reference numerals 6, 7, 8, 15, 33, 35, and 36 in FIG. 5 respectively designate structure corresponding to them in FIG. 1 or 3.

Reference numeral 41 designates a work spindle holding a workpiece thereon. Work spindle 41 is driven by a D.C. motor 42 which is controlled by a driving means 43.

Servo-controller 15 and driving means 43 are respectively connected to output terminals of select switching circuit 44.

A position detector 45 detects the infeed position of the infeed table which infeeds the workpiece thereon to be ground relative to a grinding wheel.

Both outputs of position detector 45 and in-process size detector 8 are received by a first operation circuit 46, and a difference of an actual infeed signal developed by position detector 45 from metal removal measured by in-process size detector 8, i.e. residual stock-removal is computed and transmitted to a second operation circuit 47. Second operation circuit 47 further receives a preset signal from standard residual stock-removal presetting means 48, and computes the difference of actual residual stock-removal and the preset signal. The computed output of second operation circuit 47 is transmitted to select switching circuit 44 through an amplifier 49. This computed output is used for driving means 43 to control servo-motor 7 so that the infeed table is infed with a constant residual stock-removal g (as shown in FIG. 6) during rough grinding process.

Output of in-process size detector 8 is also transmitted to a comparing circuit 50 which receives further three kinds of standard work diameter values, $P_6$ corresponding to the changing point from rough grinding to fine grinding, $P_7$ to the point from fine grinding to finish grinding and $P_8$ to the point of grinding finish, which are preset at a step presetting means 51. Comparing circuit 50 applies an output to select switching circuit 44 when a workpiece diameter signal from size detector 8 coincides with a standard work diameter value $P_6$, $P_7$ or $P_8$, stepping the switching state in select switching circuit 44.

Select switching circuit 44 further receives a computed output of a third operation circuit 35 through amplifier 36 and preset two values, one corresponding to infeed speed $V_F$ of infeed table 6 during finish grinding and the other corresponding to work spindle revolutional speed $N_w$, which are preset at finish grinding condition presetting means 52. This infeed speed is rather smaller than that in the fine grinding, and the ratio of this infeed speed to this work spindle speed is suitable for obtaining superior surface roughness on the workpiece. The present values for $V_F$ and for $N_W$ are respectively transmitted to servo-controller 15 and driving means 43, thereby controlling infeed table 6 and work spindle 41.

In operation of the third embodiment, the infeed speed of infeed table 6 is charged to rough grinding infeed from rapid infeed at point $P_5$ as shown in FIG. 6, and select switching circuit 44 transmits signals for rough grinding, i.e. output of residual stock-removal difference from standard value at the output terminal of amplifier 49 to servo-driver 15. Thus, servo-motor 7 drives infeed table 6, maintaining constant residual stock-removal g, with which surface roughness of the workpiece is rather deteriorated but high efficient metal removal accompanying good cylindricity and roundness.

After rough grinding step the workpiece diameter reaches the next step changing point $P_6$, and the in-process size detector output coincides with present value $P_6$. This coincident signal from comparing circuit 50 changes select switching circuit 44 to cut off the output signal of amplifier 49 and in turn to transmit the output from third operation circuit 35 into servo-controller 15. At this point $P_6$ in FIG. 6, metal removal rate presetting means 33 is energized as in second embodiment at point $P_3$. Thus, servo-motor 7 drives infeed table 6 along a predetermined metal removal line in FIG. 6, the grinding wheel effecting fine grinding on the workpiece.

When workpiece diameter reaches the value $P_7$ as shown in FIG. 6, the in-process size detector output coincides with preset value $P_7$ and this coincident signal from comparing circuit 50 changes select switching circuit 44 to cut off the output signal of the third operation circuit 35 and to transmit the two preset values of the finish grinding condition presetting means 52 respectively into servo-controller 15 and into driving means 43. Accordingly, servo-motor 7 drives infeed table 6 at infeed speed $V_F$ and D. C. motor 42 drives work spindle 41 at revolutional speed $N_W$, whereby the grinding wheel effects finish grinding on the workpiece with very small infeed $V_F$.

When workpiece diameter reaches at $P_8$, the in-process size detector output coincides with preset vlaue $P_8$ and this coincident signal from comparing circuit 50 changes select switching circuit 44 to cut off inputs from finish grinding condition presetting means 52, reversing servo-motor 15 to rapidly return infeed table 6 and returning the work spindle revolution speed as before.

In the embodiments, it is preferable for preventing chattering during the grinding process that the apparatus further be provided with a speed randomizing means for the work spindle during a fine or finish grinding step.

What is claimed is:

1. A grinding method with metal removal rate control comprising: continuously or intermittently measuring the rate of metal removal of a workpiece during a grinding operation; comparing the measured metal removal rate with a predetermined metal removal program value and providing a difference signal indicative of the difference between the actual metal removal rate from the program value; controlling the grinding operation in accordance with the difference signal to suppress the difference signal; measuring grinding tool deterioration during grinding; and selecting a lower predetermined program value of metal removal rate for determining the difference signal when the measured grinding tool deterioration exceeds a certain amount.

2. A grinding method with metal removal rate control as claimed in claim 1, wherein detecting grinding tool deterioration comprises detecting the tangential grinding force between the grinding tool and the workpiece and developing a signal representative of the tangential grinding force.

3. A grinding method with metal removal rate control as claimed in claim 2, wherein the grinding tool is a spindle mounted grinding wheel, and wherein said tangential grinding force is detected by detecting the electric power consumption of a spindle motor which rotates the grinding wheel.

4. A grinding method including a rough grinding process and a fine grinding process, wherein the fine grinding process is carried out with the grinding method of metal removal rate control as claimed in claim 1.

5. A grinding method as claimed in claim 4, wherein the rough grinding process is carried out with residual metal removal control, wherein a difference between actual infeed of the grinding wheel and actual metal removal is controlled to within a predetermined value.

6. A grinding method as claimed in claim 5, further including a finish grinding process after said fine grinding process, wherein said finish grinding is controlled to maintain the ratio of infeed speed of the grinding wheel to a work spindle revolutional speed constant.

* * * * *